United States Patent [19]

Narukawa et al.

[11] Patent Number: 5,432,045
[45] Date of Patent: Jul. 11, 1995

[54] PHOTO-SOLIDIFICATION MODELING APPARATUS AND PHOTO-SOLIDIFICATION MODELING METHOD HAVING AN IMPROVED RECOATING PROCESS

[75] Inventors: Hidetaka Narukawa, Matsudo; Naoichiro Saito, Fujisawa; Seiji Hayano, Inagi; Kazunori Tani, Akishima; Hatsumi Naruo, Oume; Ichitaro Sarada, Tokorozawa, all of Japan

[73] Assignees: CMET, Inc.; YAC Corporation, both of Tokyo, Japan

[21] Appl. No.: 185,848

[22] PCT Filed: Apr. 5, 1993

[86] PCT No.: PCT/JP93/00439
§ 371 Date: Jan. 25, 1994
§ 102(e) Date: Jan. 25, 1994

[87] PCT Pub. No.: WO93/24303
PCT Pub. Date: Dec. 9, 1993

[30] Foreign Application Priority Data

May 28, 1992 [JP] Japan .................. 4-159997

[51] Int. Cl.⁶ .............................. G03C 5/00
[52] U.S. Cl. ........................... 430/269; 425/162; 425/174; 425/174.4; 264/22; 156/58
[58] Field of Search .............. 430/269; 425/162, 174, 425/174.4; 264/22; 156/58

[56] References Cited

U.S. PATENT DOCUMENTS 2,775,758  12/1956  Munz ........................... 343/17
4,575,330  3/1986   Hull ........................... 425/174.4

FOREIGN PATENT DOCUMENTS 56-144478  11/1981  Japan .
61-114817  6/1986   Japan .
61-114818  6/1986   Japan .
3-246025   11/1991  Japan .
4-118222   4/1992   Japan .
4-169223   6/1992   Japan .

Primary Examiner—Mark A. Chapman
Attorney, Agent, or Firm—Oliff & Berridge

[57] ABSTRACT

A photo-solidification modeling apparatus and a photo-solidification modeling method, wherein the reliability of an operation for coating the upper surface of a solidified layer with an unsolidified liquid is improved and the time required to carry out the same operation is reduced. To meet the purpose, a clearance is formed between the lower surface of a recoater travelling on a solidified layer and the upper surface of the solidified layer. When this condition is satisfied, an unsolidified liquid is introduced onto the solidified layer by virtue of both the force of the lower surface of the recoater which drags the unsolidified liquid and the nature of the unsolidified liquid entering the clearance. When recesses are provided in the lower surface of the recoater, the liquid adsorbed to the surfaces of the recesses is also introduced onto the unsolidified layer.

18 Claims, 16 Drawing Sheets

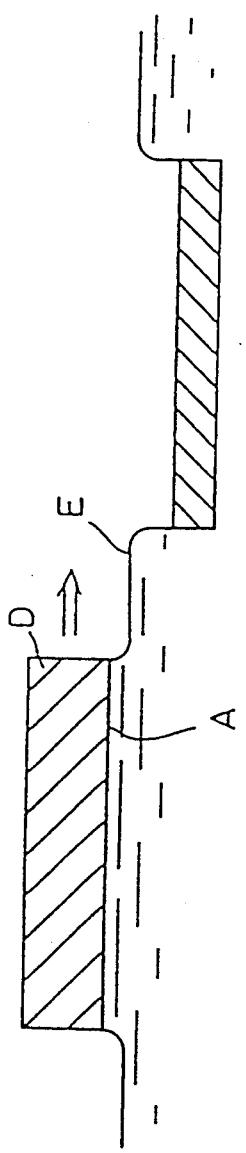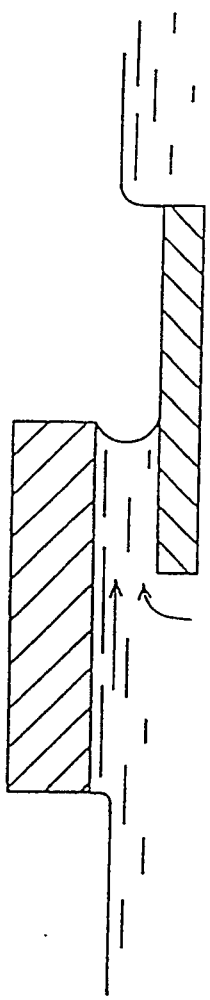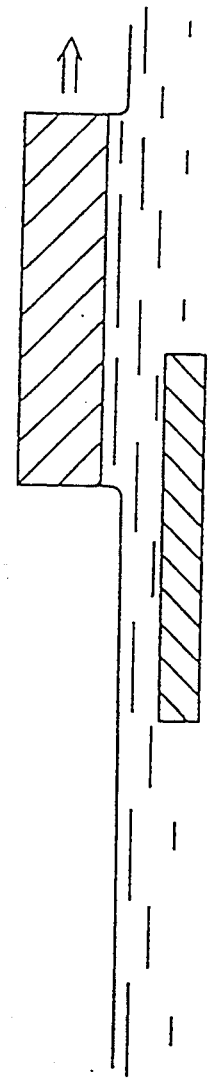

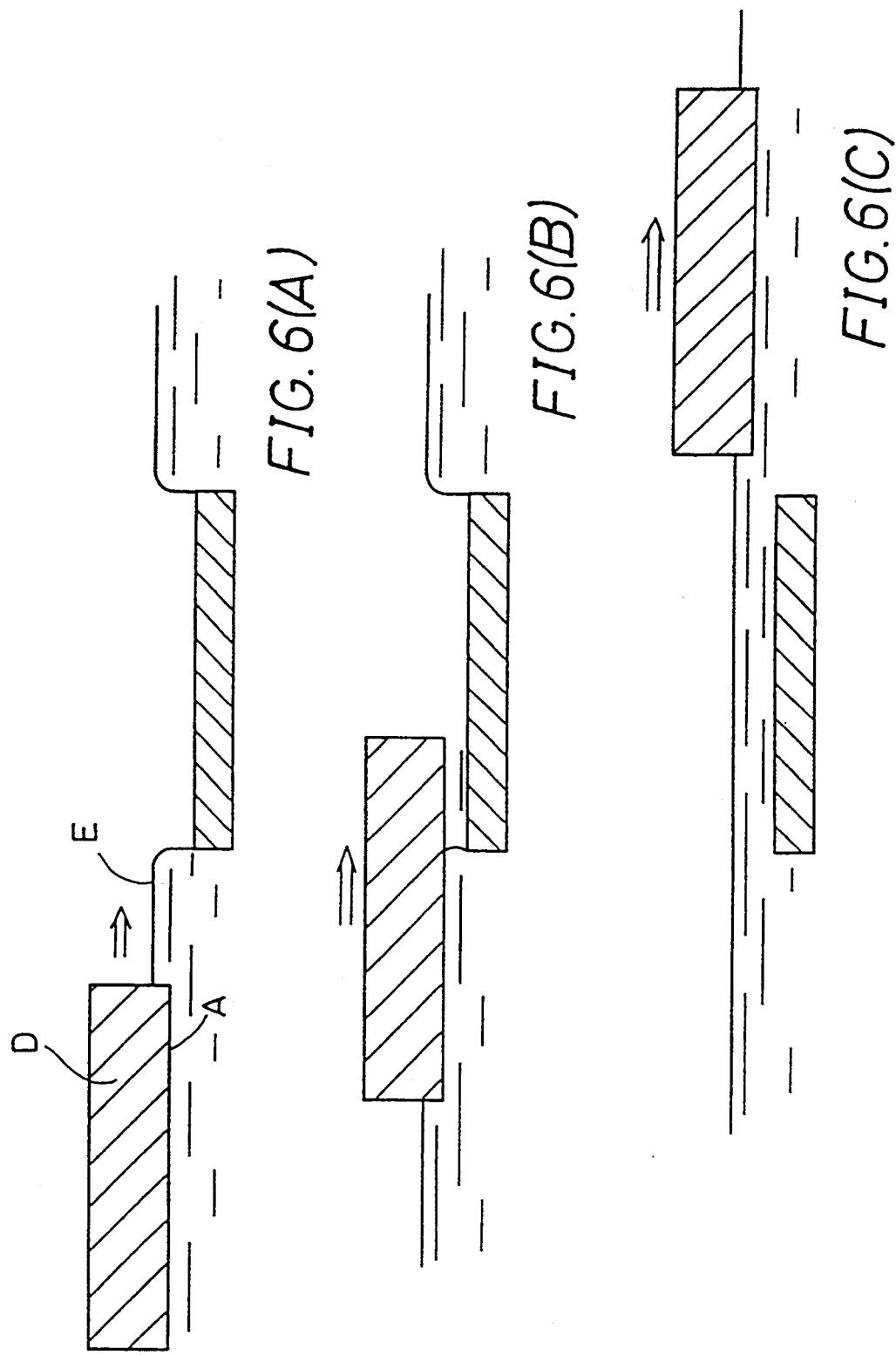

PHOTO-SOLIDIFICATION MODELING APPARATUS AND PHOTO-SOLIDIFICATION MODELING METHOD HAVING AN IMPROVED RECOATING PROCESS

TECHNICAL FIELD

The present invention relates to improvement in a photo-solidification modeling apparatus and a photo-solidification modeling method. Particularly, it relates to a technique for recoating the upper surface of a solidified layer with an unsolidified liquid.

BACKGROUND OF THE INVENTION

A photo-solidification modeling technique has been developed to fabricate an object having an non-existent three-dimensional shape. This technique utilizes a photo-solidifying liquid having a property of being solidified by light exposure. The photo-solidifying liquid is stored in a liquid vessel, and in a first step, it is exposed to a light at a given part of the liquid surface to form a solidified layer corresponding to a section. Then, in a second step, the solidified layer is immersed. In a third step, the upper surface of the solidified layer is covered (coated) with the unsolidified liquid. The first to the third steps constitute a cycle, which is repeated many times so as to fabricate a three-dimensional object having solidified layers stacked in a unitary structure. The technique is disclosed in Japanese Laid-Open Patent Publication No. 56-144478 and U.S. Pat. No. 2,775,758.

When the immersion depth of the solidified layer in a cycle is large, such immersion of the solidified layer will cause the unsolidified liquid to be introduced onto the upper surface thereof. However, when the immersion depth in a cycle is small, surface tension of the liquid will with such introduction. Various techniques have been proposed to facilitate the process of recoating by the unsolidified liquid.

U.S. Pat. No. 4,575,330 discloses a technique in which a solidified layer is once immersed deeply enough to introduce an unsolidified liquid onto the solidified layer, and then the solidified layer is moved upwardly to reduce the thickness of the unsolidified liquid. According to this technique, however, it takes much time to obtain a quiet liquid surface, which makes it difficult to reduce the time required for recoating.

Japanese Laid-Open Patent Publication No. 61-114818 discloses a technique in which a smooth plate is swept over a solidified layer to force an unsolidified liquid by the front surface of the smooth plate and thereby to introduce the unsolidified liquid onto the solidified layer. In another technique, a brush is used in place of the smooth plate (See Japanese Laid-Open Patent Publication No. 3-246025 filed by the applicant of this application). In this system, however, it is difficult to keep on forcing a sufficient amount of unsolidified liquid over the solidified layer, and consequently a solidified layer having a wide extension will have some portions unrecoated or be left unrecoated at some parts of the surface thereof. In order to prevent this, the smooth plate or brush must be reciprocated many times, resulting in much time required for the recoating process.

DISCLOSURE OF THE INVENTION

It is an object of the present invention to reduce the time required for the recoating process and to prevent generation of such unrecoated portions.

To this end, the present invention provides a photo-solidification modeling apparatus including light radiating means for exposing photo-solidifying liquid to a light at a given part of the liquid surface, immersing means for immersing a layer solidified by the light exposure, and a recoater which sweeps over the immersed solidified layer to coat the upper surface of the solidified layer with the unsolidified liquid, the recoater having a lower surface disposed opposite to the upper surface of said solidified layer and spaced apart therefrom, the space having such a distance as to cause suction of the unsolidified liquid into a clearance defined between the recoater and the upper surface of the solidified layer. The present invention also proposes a photo-solidification molding method having a cycle which includes a first step of exposing a photo-solidifying liquid stored in a liquid vessel to a light at a given part of the liquid surface to form a solidified layer, a second step of immersing the solidified layer, and a third step of sweeping a recoater over the solidified layer to coat the upper surface of the solidified layer with the unsolidified liquid, the cycle being repeated many times so as to fabricate a three-dimensional object, the recoater having a lower surface disposed opposite to the upper surface of said solidified layer at a space apart therefrom, the space having such a distance as to cause suction of the unsolidified liquid into a clearance defined between the recoater and the upper surface of the solidified layer, and when the recoater is swept over the solidified layer, the unsolidified liquid is introduced onto the upper surface of the solidified layer owing to both of viscous resistance acting against the lower surface and the action of suction of the unsolidified liquid into the clearance.

According to the photo-solidification modeling apparatus or modeling method of the above arrangement, a clearance is defined between the lower surface of the recoater and the upper surface of the solidified layer, the clearance being small enough to cause suction of the unsolidified liquid into the clearance due to the surface tension. As shown in FIGS. 1(B) to 1(D), suction referred to herein means an action of advance of the unsolidified liquid into the clearance between the lower surface A of the recoater and the upper surface B of the solidified layer through an effect similar to the capillary phenomenon (the liquid advances sequentially from C1 to C2 and then to C3). Thus, the above apparatus and method are effective to smoothly introduce the unsolidified liquid over the upper surface B of the solidified layer. At this time, as the recoater D itself is swept as shown in FIGS. 2(A) and (B), the unsolidified liquid is dragged by the viscous resistance acting against the lower surface of the recoater, which promotes introduction of the unsolidified liquid onto the upper surface of the solidified layer.

The distance of the clearance (gap) may be equal to the amount of immersion of the solidified layer in a cycle, as shown in FIGS. 3(A) to 3(D). This condition is realized by locating the lower surface A of the recoater D in the same plane as the liquid level E. Thus, as shown in FIG. 3(C), the unsolidified liquid is introduced onto the solidified layer by the dragging action of the recoater D (diagrammatically shown by an arrow F) and by the suction action into the clearance (diagrammatically shown by an arrow G), and immediately after the recoater has traveled, the liquid surface restores the normal liquid level E (See FIG. 3(D)).

The distance of the clearance (gap) may be greater than the amount of immersion of the solidified layer in a cycle, as shown in FIGS. 4(A) to 4(C). The condition is realized by locating the lower surface A of the recoater D slightly above the liquid level E. As shown in FIGS. 5(A) to 5(C), when the recoater D having the lower surface A being in contact with the liquid level E is lifted above, the liquid is raised above in adhesion to the lower surface A of the recoater (See FIG. 5(B)). It must be noted that the adhesion action will be lost by lifting it too high (See FIG. 5(C)). If the lower surface A of the recoater D is located within the range in which the adhesion action can be kept as shown in FIG. 5(B), recoating is achieved as shown in FIGS. 4(A) to 4(C).

The distance of the clearance (gap) may be smaller than the amount of immersion of the solidified layer in a cycle, as shown in FIGS. 6(A) to 6(C). This condition is realized by locating the lower surface A of the recoater D slightly below the liquid level E. Recoating can be achieved smoothly also in this case, as shown in FIGS. 6(A) to 6(C).

The lower surface A of the recoater D is not necessarily flat, and, for example, it may have irregularities as shown in FIGS. 7(B) and 7(C). At this time, the lower surface A of the recoater may be vertically movable between the levels H and I, where H is the level of the lower surface of the recoater above which the adhesion will be lost and I is the level of the upper surface of the solidified layer immersed in the liquid. Even when there are such irregularities, both of the viscous resistance and the action of suction into the clearance are obtainable, ensuring smooth recoating.

Such irregularities may define a recess or recesses of a large volume which will be effective to store the liquid therein, permitting a large amount of unsolidified liquid to be conveyed onto the upper surface of the solidified layer. FIGS. 8(A) and 8(B) diagrammatically illustrate the function of such storages, and in this case, the solidified layer is recoated with the unsolidified liquid through the effect of reduction of the stored liquid (J) in addition to the dragging action (F) caused by travel of the recoater D and the suction action (G). Thus, travel of the recoater at a higher speed will not cause generation of unrecoated portions.

Further, the irregularities formed on the lower surface of the recoater will cause increased viscous resistance between the lower surface and the unsolidified liquid and consequently increased dragging action.

In case the recoater D has both outer side surfaces D1 and D2 each gradually outwardly extending at the lower end thereof as shown in FIG. 9(A), the suction effect to the capillary phenomenon occurring at the outer side surfaces D1 and D2 will be restricted, permitting the liquid surface to be stabilized after the travel of the recoater. Thus, waving of the liquid surface caused immediately after travel of the recoater can be effectively restricted, permitting recoating in a uniform thickness and formation of a quite thin recoated layer. FIG. 9 (B) shows a recoater having conventional outer side surfaces by which the liquid is drawn as shown by K. This problem will be eliminated by the recoater having the outer side surfaces gradually outwardly extending at the lower end.

In case the lower surface of the recoater has a portion immersed in the unsolidified liquid, the phenomenon of upwardly raising a portion of the liquid surface by adhesion can be stably maintained. For example, even when the adhesion is lost for some reason as shown in FIG. 10(A), suction is started to occur at the portion immersed in the liquid to restore the condition in which a portion of the liquid surface is raised by adhesion, as shown in FIG. 10(D).

The present invention will be more fully understood from the following description about the drawings and preferred embodiments.

BRIEF DESCRIPTION OF THE DRAWINGS

FIGS. 4(A) to 4(C) illustrate the phenomenon occurring when the recoater travels above the liquid level;

FIGS. 6(A) to 6(C) illustrate the phenomenon occurring when the recoater travels below the liquid level;

BEST MODES OF EMBODYING THE INVENTION

Figure 11:
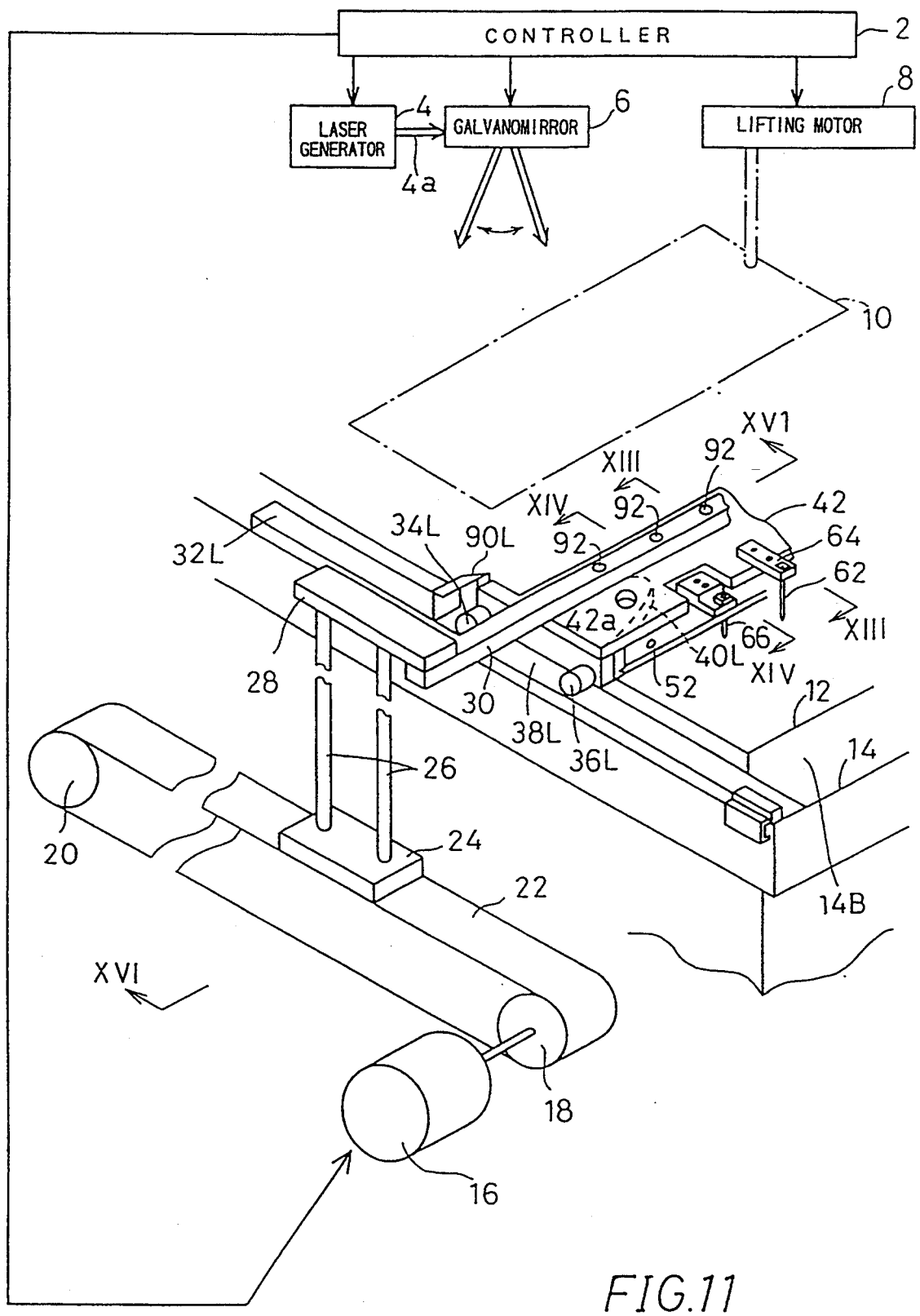
FIG. 11 is a perspective view of a recoater of a first embodiment.
Figure 12:
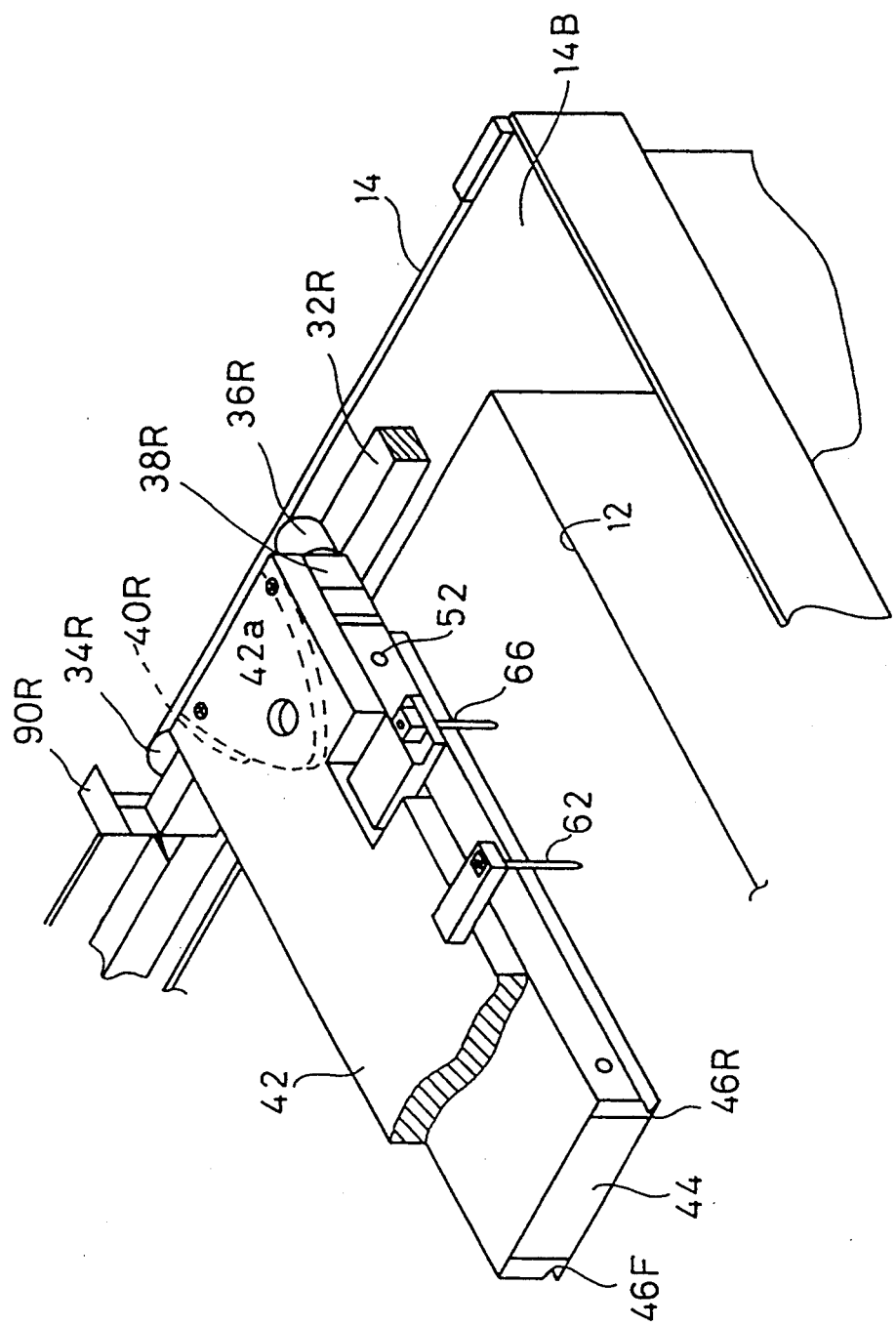
FIG. 12 is a perspective view of another portion of the recoater.

FIGS. 11 and 12 are perspective views of a photo-solidification modeling apparatus according to a first embodiment of the present invention, which includes a liquid vessel 12 for storing a photo-solidifying liquid therein. A galvanomirror 6 is provided above the liquid vessel 12 and is adapted to reflect a laser beam 4a emitted from a laser generator 4 so as to expose a given part of the liquid surface in the liquid vessel 12 thereto. A lifting table 10 is disposed within the liquid vessel 12 so as to be vertically movable, and the lifting table 10 is moved up and down by a lifting motor 8. The laser generator 4, the galvanomirror 6 and the lifting motor 8 are controlled by a controller 2. The liquid vessel 12 has a peripheral edge surrounded by a wall 14 for collecting overflow liquid, so that the photo-solidifying liquid overflowing the upper edge of the liquid vessel 12 can be collected in an overflow tank 14B defined by the wall 14, and the collected liquid is returned to the liquid vessel 12 by a pump (not shown). This circulation always keeps the photo-solidifying liquid overflowing the liquid vessel 12, keeping the liquid level constant.

The method of keeping the liquid level constant or the method of sweeping the laser beam can be modified in various ways well known to those of skill in the art.

A recoater traveling motor 16 is fixed to a side of the liquid vessel 12, and the motor 16 rotates a pulley 18 so as to rotate a belt 22 trained around the pulley 18 and another pulley 20. The motor 16 is controlled by the controller 2.

A block 24 is secured to the belt 22, and supporting posts 26 are fixedly attached to the block 24. A block 28 is secured to the supporting posts 26, and a bar 30 is fixed to the block 28.

Rails 32L and 32R (See also FIG. 12) are fixedly attached to the inside of the wall 14 for collecting overflow liquid along both sides thereof, so that a carriage 38L travels on the left rail 32L by wheels 34L and 36L and another carriage 38R travels on the right rail 32R by wheels 34R and 36R. The carriages 38L and 38R are connected with each other by a plate 42. Remover plates 90L and 90R for removing attachment such as liquid resin residue are secured to the carriages 38L and 38R, respectively, to clean the rails 32L and 32R during their traveling.

The bar 30 and the plate 42 are connected to each other by pins 92, so that, when the motor 16 rotates, the carriages 38L and 38R and the plate 42 travel on the rails 32L and 32R. The carriages 38L and 38R and the plate 42 constitute a traveling device traveling along the guide rails 32L and 32R which is a part of the recoater.

A flange 40L is fixedly attached to the carriage 38L under the plate 42, while another flange 40R is fixedly attached to the carriage 38R. The flanges 40L and 40R have respective through holes 40a (See also FIG. 13), and the plate 42 has through holes 42a at corresponding positions. Each of the through holes 42a has a diameter through which a head of a bolt 48 can pass, while each of the through holes 40a has a diameter through which the shank can pass but the head cannot.

A lower plate 44 is suspended under the plate 42. Specifically, it is suspended by bolts 48 threaded in threaded holes 44a of the lower plate 44. Compression springs 50 are interposed between the flanges 40L and 40R and the lower plate 44. Thus, the lower plate 44 is urged downwardly, and can be raised upwardly by fastening the bolts 48 therein, while the lower plate 44 is lowered by unfastening the bolts 48. In other words, the lower plate 44 is vertically adjustable in relation to the carriages 38L and 38R and the plate 42 traveling along the guide rails 32L and 32R.

Figure 13:
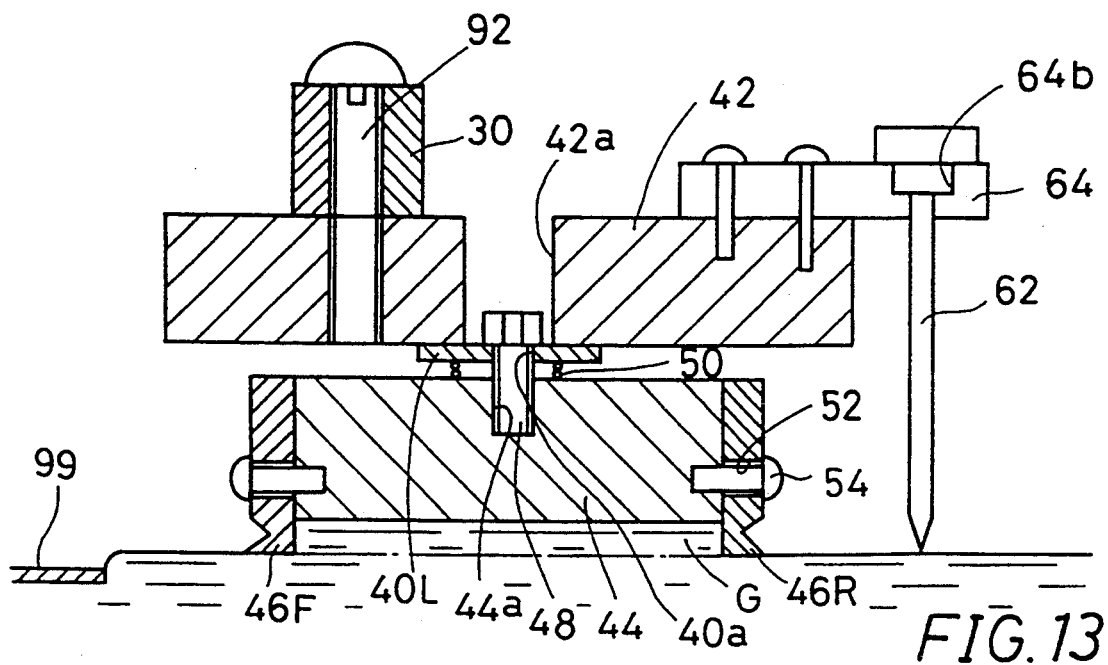
FIG. 13 is a sectional view taken along line XIII—XIII in FIG. 11.

As shown in FIG. 13, a pair of blades 46F and 46R are attached by screws on respective side surfaces of the lower plate 44. Each of the blades 46F and 46R has a vertically elongated slot 52 so as to permit vertical adjustment of the blades 46F and 46R in relation to the lower plate 44. The lower plate 44 and the pair of blades 46F and 46R constitute a recoating device. The recoater is constituted by the traveling device and the recoating device.

Figure 15:
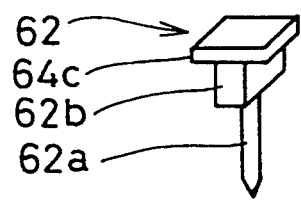
FIG. 15 is a perspective view of a needle.

A first needle gauge 62 is attached to the upper plate 42 through a bracket 64. As shown in FIG. 15, the first needle gauge 62 is composed of a needle portion 62a, a rectangular-in-section portion 62b and a square-in-section portion 62c provided in sequence from below, and the bracket 64 has a through hole 64b of a rectangular section for receiving the rectangular-in-section portion 62b. When the rectangular-in-section portion 62b is properly oriented to be fitted in the hole 64b of the rectangular section, the needle portion 62a is suspended, as shown in FIG. 13. When the orientation of the rectangular-in-section portion 62b is offset in relation to that of the hole 64b, the needle portion 62a is brought upwardly. In this condition, it is in its retracted condition.

Figure 16:
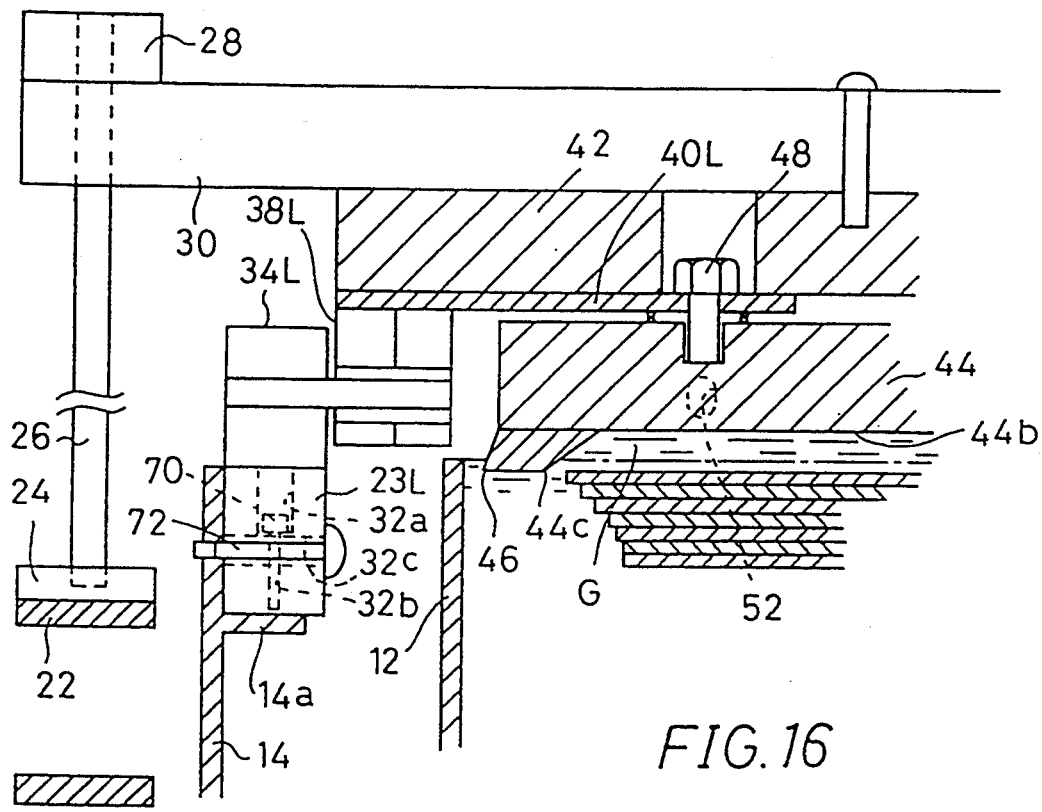
FIG. 16 is a sectional view taken along line XVI—XVI in FIG. 11.
Figure 17:
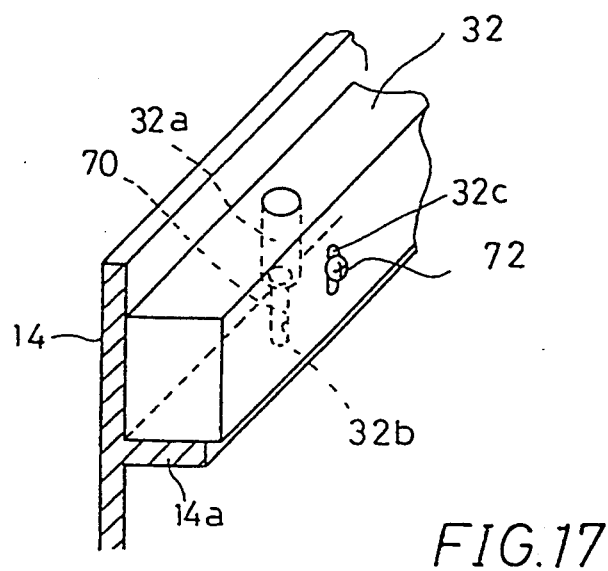
FIG. 17 is a view illustrating the mounting portion of a rail.

The left and right guide rails 32L and 32R are vertically adjustable on the wall 14 for collecting overflow liquid. As shown in FIGS. 16 and 17, each of the rails 32L and 32R has at either end thereof an enlarged-diameter hole 32a and a reduced-diameter hole 32b, both extending vertically and the reduced-diameter hole 32b being threaded. A screw 70 is threadedly engaged in the hole 32b, and the extreme end of the screw 70 is in abutment against a flange 14a of the wall 14. Thus, when the screw 70 is fastened, the guide rail 32 is lifted, while, when the screw 70 is unfastened, the guide rail 32 is lowered. The rail 32 has a through hole 32c extending transversely, and a screw 72 is inserted through the through hole 32c and fastened into the wall 14 to fix the level of the guide rail. The through hole 32c through which the screw 72 is inserted is a vertically elongated slot.

The first needle gauge 62 and the vertical adjustment mechanism for the guide rail are used mainly to adjust the parallelism between the liquid surface and the guide rails 32L and 32R.

Specifically, by checking the relation to the liquid surface by the first needle gauge 62, the screw 70 is adjusted so as to obtain parallelism between the guide rails 32L and 32R and the liquid surface.

Figure 14:
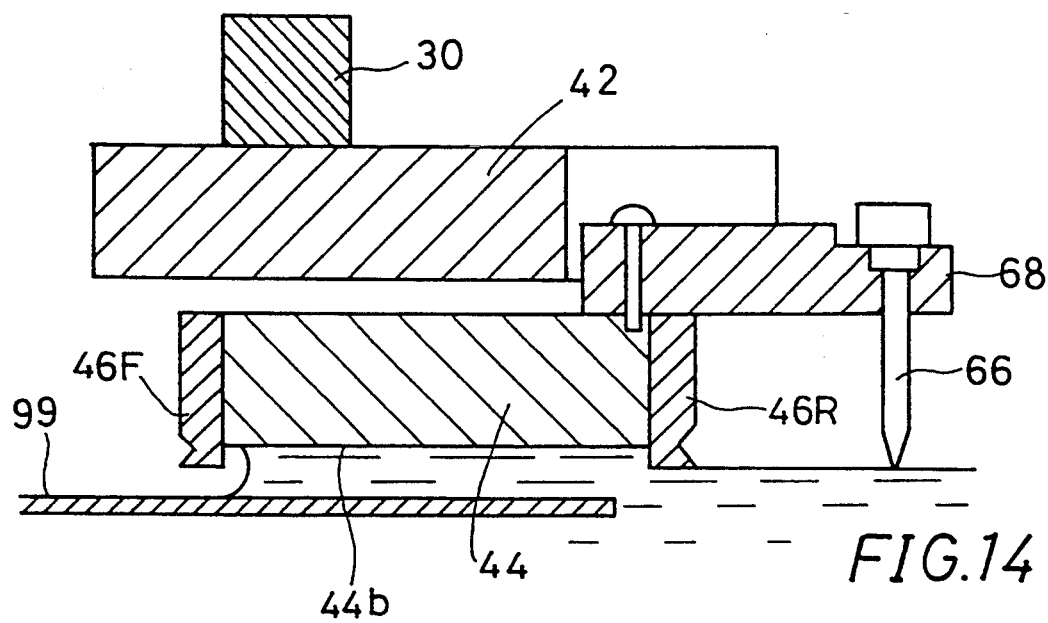
FIG. 14 is a sectional view taken along line XIV—XIV in FIG. 11.

As shown in FIG. 14, a second needle gauge 66 is attached to the lower plate 44 through a bracket 68. The second needle gauge 66 can be set or reset between its operating position and its retracted position in the same way as the first needle gauge 62. By checking the position in relation to the liquid level by the second needle gauge 66, the screw 48 is fastened or unfastened to position the lower edges of the blades 46F and 46R on a level with the liquid surface.

Adjustment has been made using the slots 52 of the blades 46F and 46R to position the lower end of the second needle gauge 66 on a level with the lower edges of the blades 46F and 46R.

The apparatus is adjusted as follows.

(1) First adjustment is to position the lower end of the second needle gauge 66 on a level with the lower edges of the blades 46F and 46R. For this adjustment, the slot 52 is used.

(2) Second adjustment is to obtain parallelism between the guide rails 32L and 32R and the liquid surface. For this purpose, as the carriages 38L and 38R are moved, the screw 70 is adjusted to position the first needle gauge 62 on a level with the liquid surface at all times.

(3) Then, the screw 48 is adjusted to position the second needle gauge 66 on a level with the liquid surface. This permits the lower edges of the blades 46L and 46R to be kept on a level with the liquid surface, wherever the carriages 38L and 38R may be.

As the result, the bottom surface 44b of the lower plate 44 is adjusted to be at a position slightly above the liquid level, as shown in FIG. 16. The lower plate 44 has side edges 44c attached to both sides of the bottom surface 44b and adjusted on the level where the lower surfaces of the side edges 44c may be at a position slightly immersed in the liquid. Thus, the suction effect as described with reference to FIGS. 10(A) to 10(D) is started to occur at the side edges 44c, so that the photo-solidifying liquid is adhered into the clearance as shown by G in FIG. 13 or 16. The traveling paths of the side edges 44c are not exposed to a light so as to prevent any interference between a solidified layer and the side edges 44.

When the liquid surface is waved, the liquid comes in contact with the bottom surface 44b, causing adhesion to be started to occur therefrom, so the side edges 44c may be omitted. The lower surfaces of the side edges 44c may be positioned above the liquid level. Even in this case, the adhesion action can be maintained.

Figure 1A:
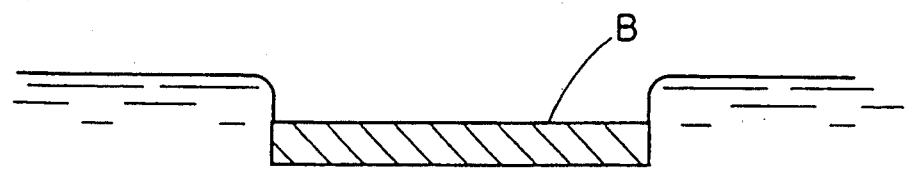
FIGS. 1(A) to 1(D) illustrate the suction effect which the present invention utilizes.
Figure 1B:
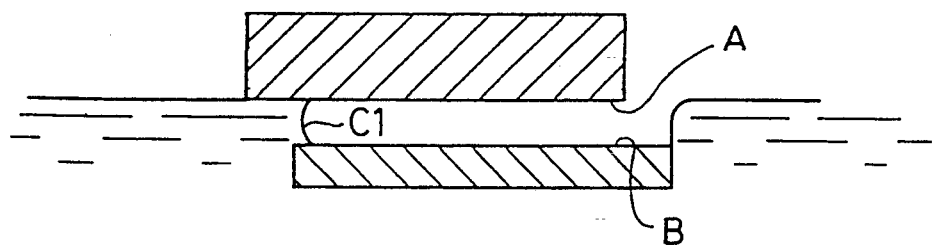
Figure 1C:
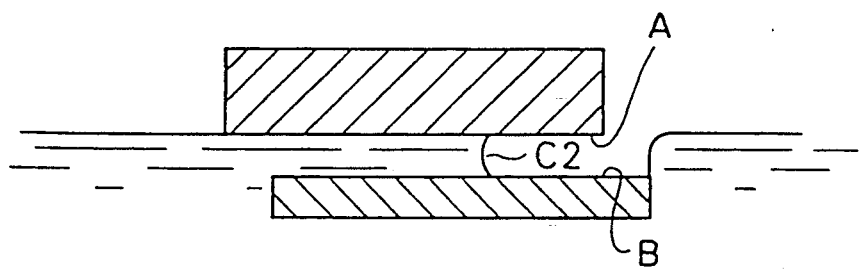
Figure 1D:
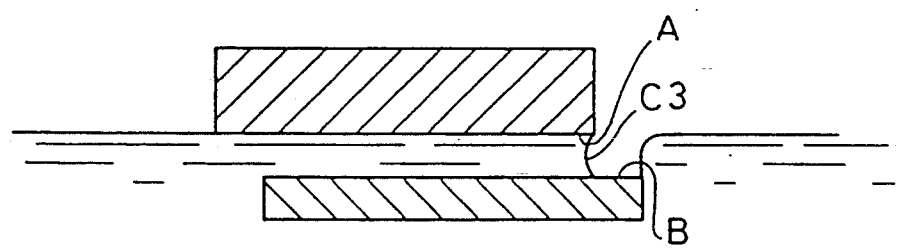
Figure 2A:
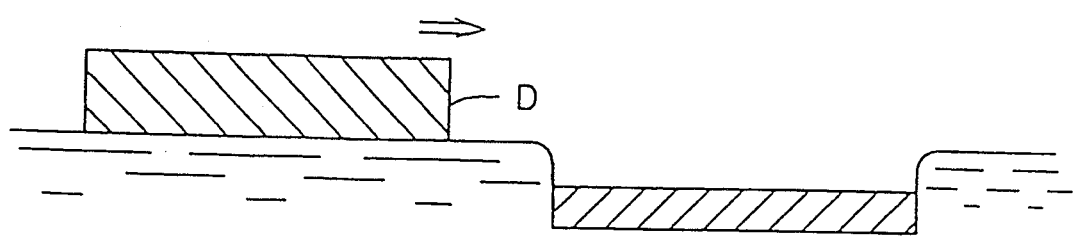
FIGS. 2(A) and 2(B) illustrate the dragging effect which the present invention utilizes.
Figure 2B:
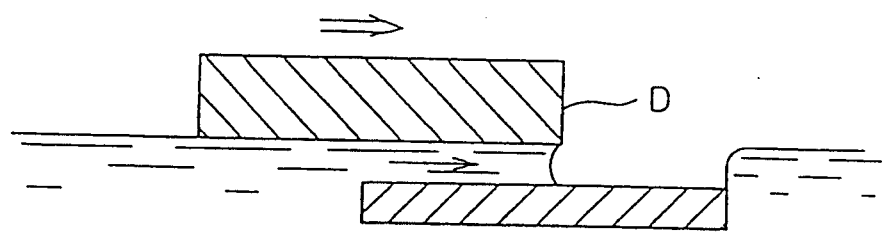
Figure 3A:
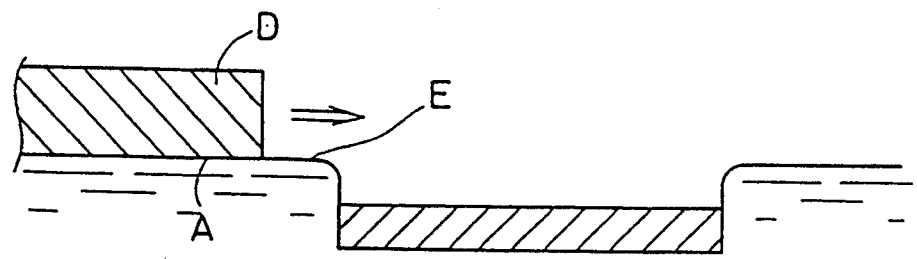
FIGS. 3(A) to 3(D) illustrate the phenomenon occurring when the recoater travels on the liquid level.
Figure 3B:
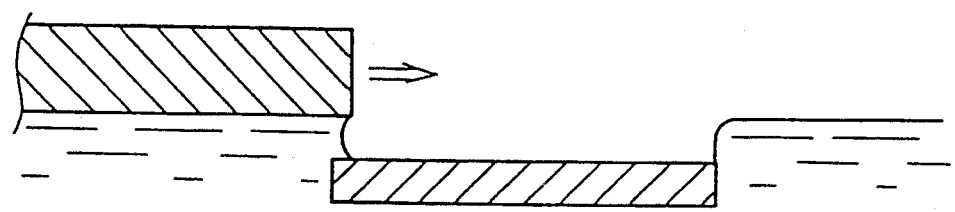
Figure 3C:
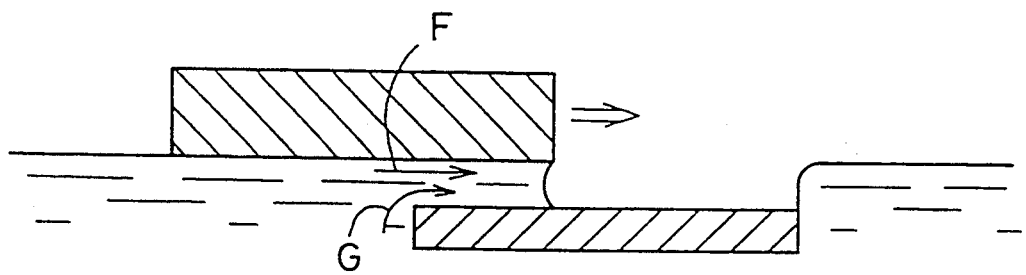
Figure 3D:
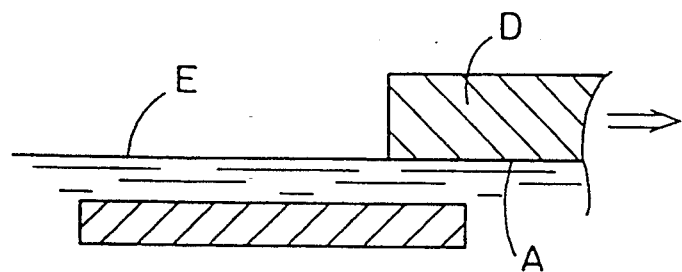
Figure 5A:
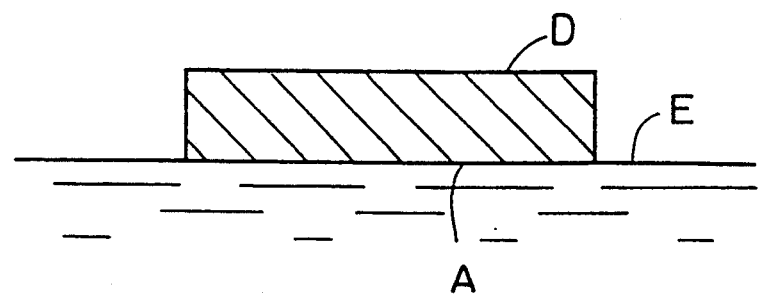
FIGS. 5(A) to 5(C) illustrate the adhesion effect which the present invention utilizes.
Figure 5B:
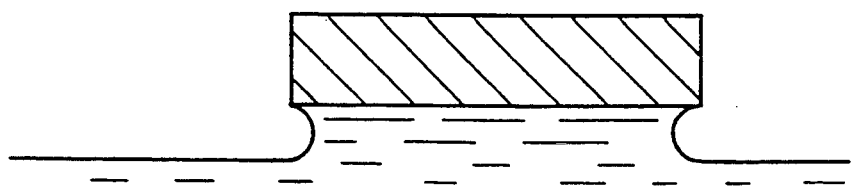
Figure 5C:
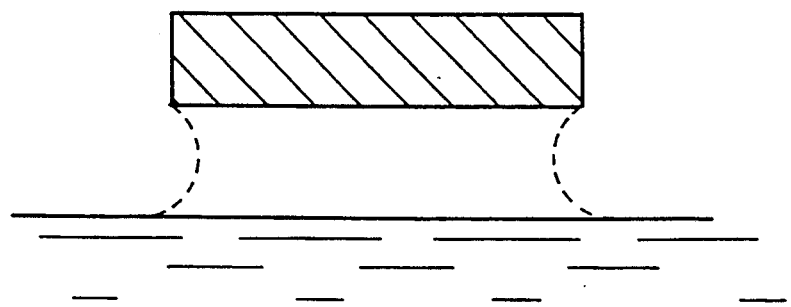
Figure 7A:
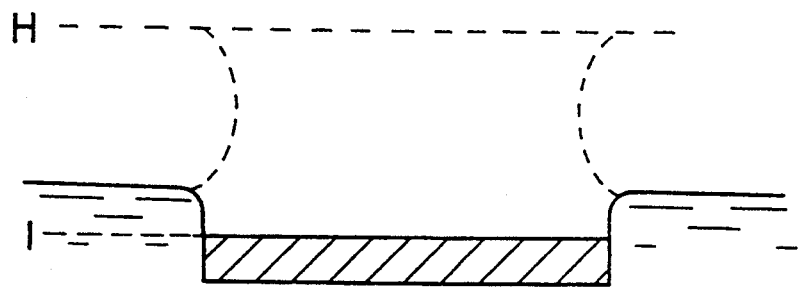
FIGS. 7(A) to 7(C) illustrate irregularities on the lower surface of the recoater.
Figure 7B:
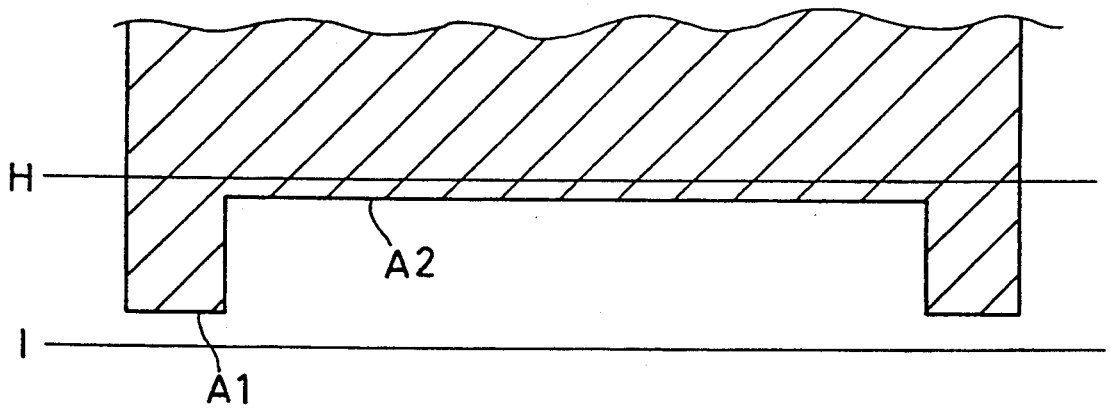
Figure 7C:
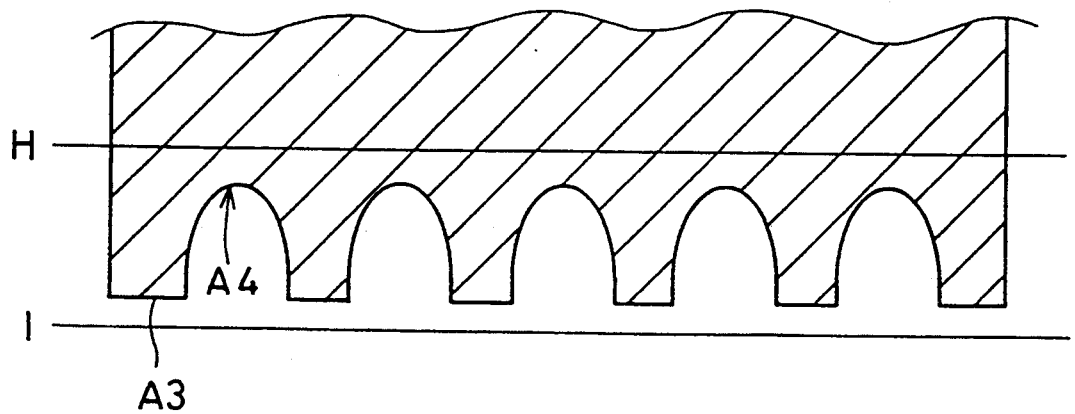
Figure 8A:
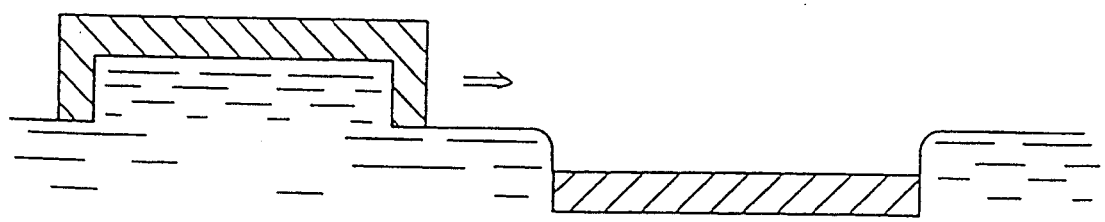
FIGS. 8(A) and 8(B) illustrate the liquid storing effect of the irregularities of the lower surface of the recoater.
Figure 8B:
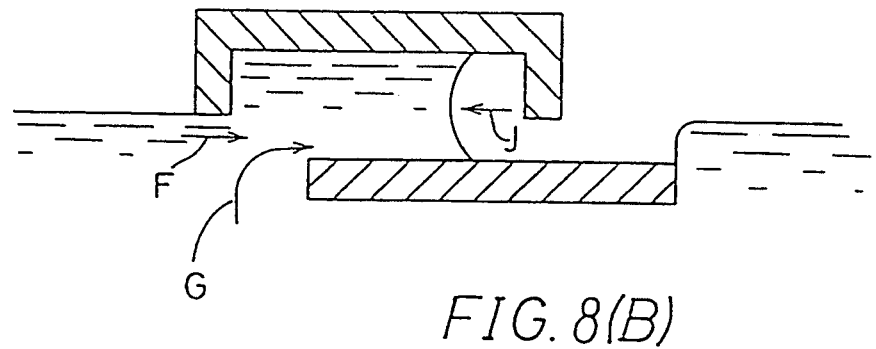
Figure 9A:
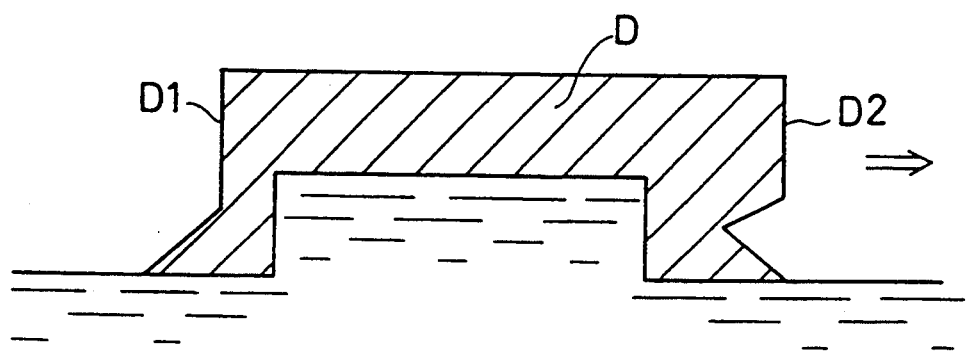
FIGS. 9(A) and 9(B) illustrate the effect obtainable by the recoater gradually outwardly extending at the lower ends thereof.
Figure 9B:
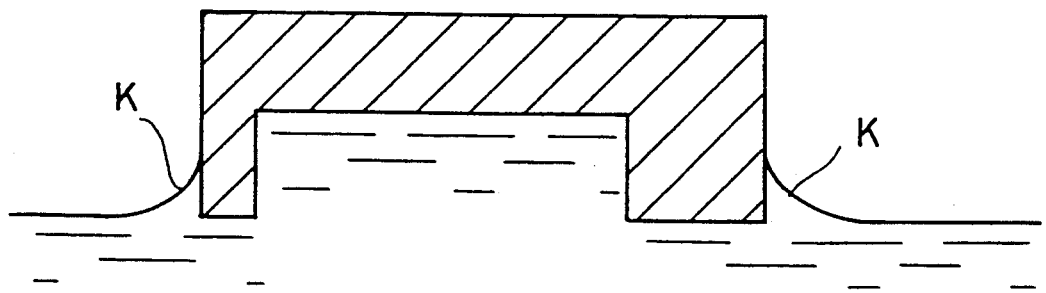
Figure 10A:
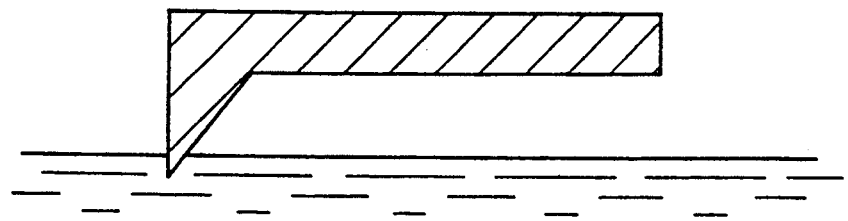
FIGS. 10(A) to 10(D) illustrate the process of obtaining the adhesion effect from the suction effect.
Figure 10B:
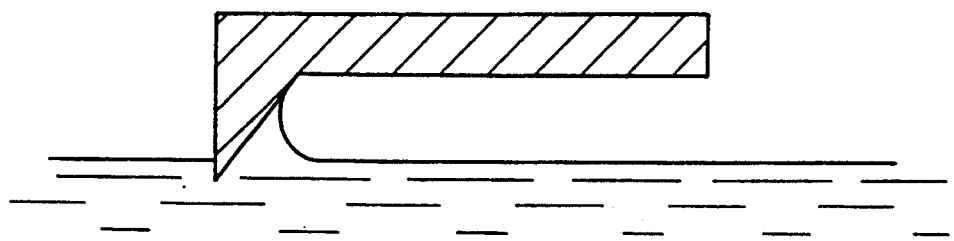
Figure 10C:
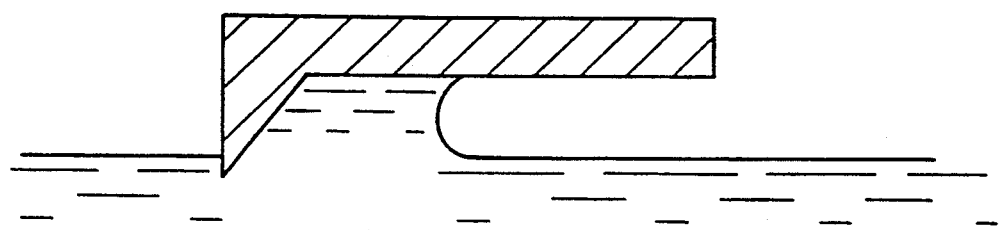
Figure 10D:
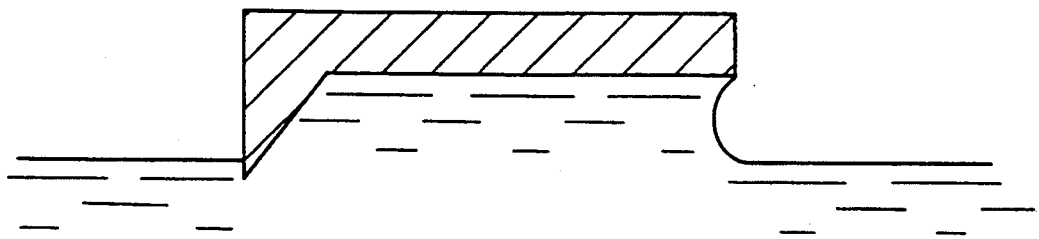

As shown in FIGS. 13 and 14, each of the blades 46F and 46R has a V-shaped groove formed in the outside lower end portion, so that the outside lower end portions of the blades 46F and 46R gradually outwardly extend at the lower edges thereof. This is effective to prevent a problem as shown in FIG. 9(B).

In this embodiment, when the solidified layer is immersed along with the lift table 10, the motor 16 is rotated to sweep the lower plate 44 and the blades 46F and 46R.

At this time, the sweep is carried out with the unsolidified photo-solidifying liquid adhered to the lower surface 44b of the lower plate 44, as shown in FIGS. 3(A) to 3(D). Thus, as shown in FIG. 14, the unsolidified photo-solidifying liquid is introduced onto the upper surface of the solidified layer 99. In association with such introduction, there occur a phenomenon that the liquid is dragged by the bottom surface 44b of the lower plate 44 and another phenomenon that the liquid is sucked into the clearance G between the upper surface of the solidified layer 99 and the lower surface 44b of the lower plate 44. There occurs a further phenomenon that the liquid stored in the clearance G is gradually transferred onto the solidified layer 99. As these three effects work to introduce the unsolidified liquid onto the solidified layer, there is no fear of shortage of liquid, even when the extent of the solidified layer is large, assuring satisfactory recoating.

The motor 16 is controlled so that the recoater may travel one way over the whole area of the liquid vessel 12 in each sweeping cycle thereof. However, when a small model is to be fabricated in a large-sized liquid vessel, it will be unnecessary to sweep the whole area of the liquid vessel, but the travel will be limited only to the portion in which the solidified layer exists. This is carried out in two ways, one of which is to define a constant sweeping range for the recoater throughout the modeling operation of an object. In this case, sections of the object are stacked in layers to limit the sweeping range to a minimum range in which the outermost area of the sections is contained. In the other way, the sweeping range is limited to a minimum range so determined, after formation of a sectional layer, as to contain the section or an extent exposed to a light immediately before and a subsequent section or an extent to be exposed to a light in a subsequent process. Thus, the time required for recoating can be further reduced.

In the first embodiment, the description has been given as to the case in which the lower edges of the blades 46 are positioned on a level with the liquid surface by the second needle gauge 66. In this case, the distance between the lower edge of the recoater or the lower edges of the blades 46 and the upper surface of the solidified layer is equal to the amount of immersion of the solidified layer in a cycle. As is apparent from the description as to FIGS. 4(A) to 4(C) and 6(A) to 6(C), however, the lower edges of the blades 46 are not required to be positioned strictly on a level with the liquid surface but they may be positioned slightly above or below the liquid level. If they are above the liquid level, the distance between the lower edges of the blades 46 and the upper surface of the solidified layer is greater than the amount of immersion in a cycle, while, if they are below the liquid level, the distance is smaller than the amount of immersion. In case they are used slightly above the liquid level, interference between the blades and the solidified layer can be positively prevented, causing no possible deflection in the shape of the object.

In this embodiment, the lower surface of the recoater is made irregular by the blades 46F and 46R and the bottom surface 44b of the lower plate 44. This is only an example, and the blades 46F and 46R may be omitted. Specifically, the quite flat bottom surface 44b of the lower plate is enough to carry out satisfactory recoating. The recoater may have a lower surface irregularly formed, for example, by stripes in a grid or curved in an arch. Greater irregularities will provide increased dragging resistance, and a greater volume of the recesses will introduce more amount of liquid onto the upper surface of the solidified layer. Thus, the recoater may travel at a higher speed than before. The irregularities of the lower surface of the recoater may be formed by surface treatment such as etching.

Figure 18:
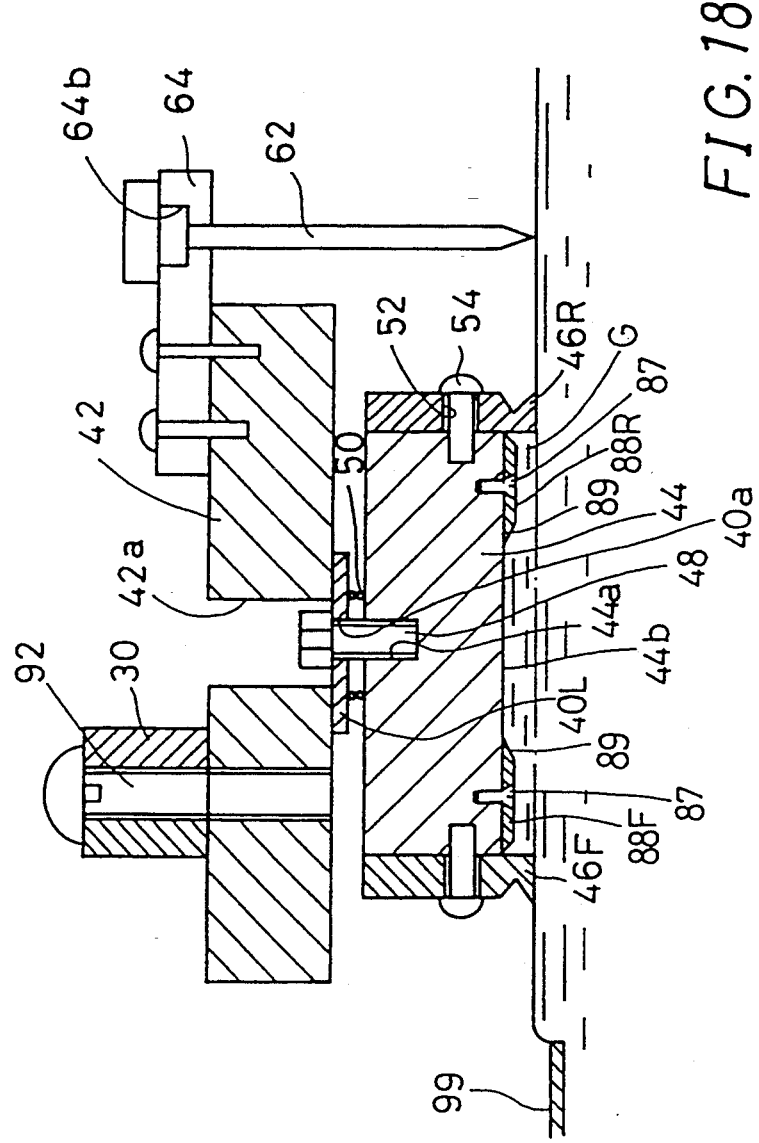
FIG. 18 is a view illustrating a modification of the recoater.

Preferably, the recoater is formed of a rustless material having good heat resistance and acid resistance, such as stainless steel, aluminium, nylon, Teflon and polycarbonate. Front edges 88F and 88R may be added to the lower surface of the recoater, as shown in FIG. 18. In this case, the front edges 88F and 88R longitudinally extend between the side edges, with the lower surfaces thereof being positioned on the intermediate level between the bottom surface 44b of the recoater body and the lower edges of the blades 46. Provision of the front edges 88F and 88R allows the phenomenon of adhering the liquid to the lower surface of the recoater to develop smoothly. The front edges are not required to be provided in a pair but a single front edge may be provided.

Figure 19:
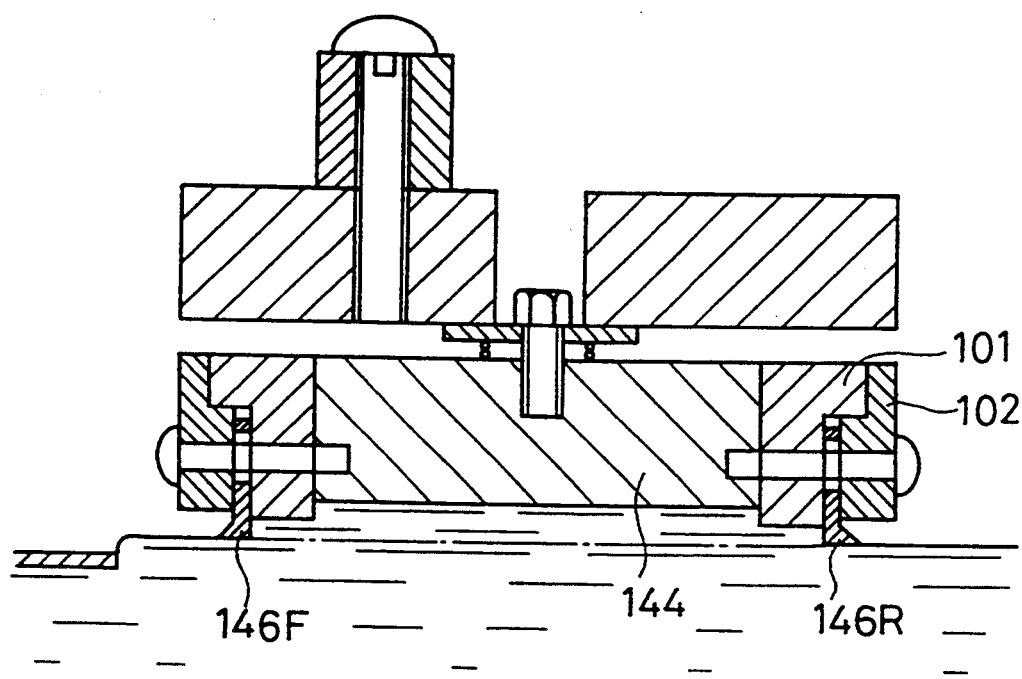
FIG. 19 is a view similar to FIG. 13 but illustrating a second embodiment.

FIG. 19 shows a second embodiment of blades 146F and 146R. Specifically, blade mounting members 101 and 102 are used to attach the blades 146F and 146R to the lower plate 144. This also provides good recoating. The blades 146F and 146R may have lower edges gradually extending as shown in the drawing.

According to the apparatus, the adhesion effect and dragging resistance are used to carry out the recoating process. Further, the lower surface of the recoater having recessed portions is effective to bring the liquid stored in the recessed portions onto the solidified layer.

What is claimed is:

1. A photo-solidification modeling apparatus including;

light exposing means for exposing a photo-solidifying liquid to a light at a given part of a surface of the liquid;

immersing means for immersing a layer solidified by the light exposure; and a recoater for sweeping over a solidified layer which has been immersed to coat an upper surface of the solidified layer with the unsolidified liquid, wherein:

said recoater has a lower surface disposed opposite to the upper surface of said solidified layer at a space apart therefrom, the space being a distance so as to cause suction of said unsolidified liquid into a clearance defined between the lower surface of said recoater and the upper surface of the solidified layer, the distance being greater than a depth of immersion of the solidified layer in the unsolidified liquid.

2. The photo-solidification modeling apparatus defined in claim 1, wherein said lower surface is formed with irregularities whose maximum distance from the upper surface of the solidified layer is set to be less than a distance in which adhesion to the unsolidified liquid is maintained.

3. The photo-solidification modeling apparatus as defined in claim 2, wherein said irregularities are recessed portions which constitute storage spaces for the unsolidified liquid.

4. The photo-solidification modeling apparatus as defined in claim 2, wherein said irregularities increase viscous resistance of the unsolidified liquid against said lower surface.

5. The photo-solidification modeling apparatus as defined in claim 1, wherein said lower surface is formed with projections provided at positions where no solidified layer exists and are immersed in the unsolidified liquid for starting the suction.

6. The photo-solidification modeling apparatus as defined in claim 1, wherein sweeping of said recoater is guided by guide rails which are vertically adjustable in relation to an immobile part of the photo-solidification modeling apparatus.

7. The photo-solidification modeling apparatus as defined in claim 6, wherein said recoater has a first gauge attached thereto and projecting toward the liquid surface of the photo-solidifying liquid.

8. The photo-solidification modeling apparatus as defined in claim 6, wherein said recoater comprises a traveling device which is guided by said guide rails for traveling and a recoating device which is vertically adjustable in relation to the traveling device.

9. The photo-solidification modeling apparatus as defined in claim 8, wherein said recoating device has a second gauge attached thereto and projecting toward the liquid surface of the photo-solidifying liquid.

10. The photo-solidification modeling apparatus as defined in claim 8, wherein said recoating device comprises a lower plate and a pair of blades, said pair of blades being vertically adjustable in relation to the lower plate.

11. The photo-solidification modeling apparatus as defined in claim 1, further including means for limiting the sweeping range of said recoater to a minimum range which exposed to the light.

12. The photo-solidification modeling apparatus as defined in claim 1, wherein said recoater is formed of a rustless material having heat resistance and acid resistance.

13. The photo-solidification modeling apparatus as defined in claim 1, further including means for limiting the sweeping range of said recoater to a minimum range in which both of an extent of the unsolidified liquid exposed to the light immediately before and another extent of the unsolidified liquid to be exposed to the light in a subsequent process are contained.

14. The photo-solidification modeling apparatus as defined in claim 1, wherein said recoater has both outer surfaces gradually outwardly extending at the lower ends thereof.

15. A photo-solidification modeling method for fabricating a three-dimensional object by repeating a cycle a plurality of times, the cycle including:

a first step of exposing a photo-solidifying liquid stored in a liquid vessel to a light at a given part of the liquid surface to form a solidified layer;

a second step of immersing the solidified layer in an unsolidified liquid; and a third step of sweeping a recoater over the solidified layer so as to coat the upper surface of the solidified layer with the unsolidified liquid, the recoater having a lower surface disposed in opposition to the upper surface of said solidified layer at a space apart therefrom, the space being a distance so as to cause suction of said unsolidified liquid into a clearance defined between the lower surface and the upper surface of the solidified layer, the distance being greater than a depth of immersion of the solidified layer in the unsolidified liquid, wherein when the recoater is swept over the solidified layer, said unsolidified liquid is introduced onto the upper surface of the solidified layer owing to both of viscous resistance acting against said lower surface and the action of suction of said unsolidified liquid into said clearance.

16. The photo-solidification modeling method as defined in claim 15, wherein recessed portions are formed in a part of said lower surface, the liquid stored in the recessed portions being transferred to the upper surface of the solidified layer.

17. The photo-solidification modeling method as defined in claim 15, wherein said third step includes a step of limiting the sweeping range of said recoater to a minimum range which is exposed to the light.

18. The photo-solidification modeling method as defined in claim 15, wherein said third step includes a step of limiting the sweeping range of said recoater to a minimum range in which both of an extent of the unsolidified liquid exposed to the light immediately before and another extent of the unsolidified liquid to be exposed to the light in a subsequent process are contained.

* * * * *